Nov. 12, 1968
A. J. ARSENAULT
3,410,016
FISHING ROD HANDLING DEVICE
Filed Oct. 22, 1965
3 Sheets-Sheet 1
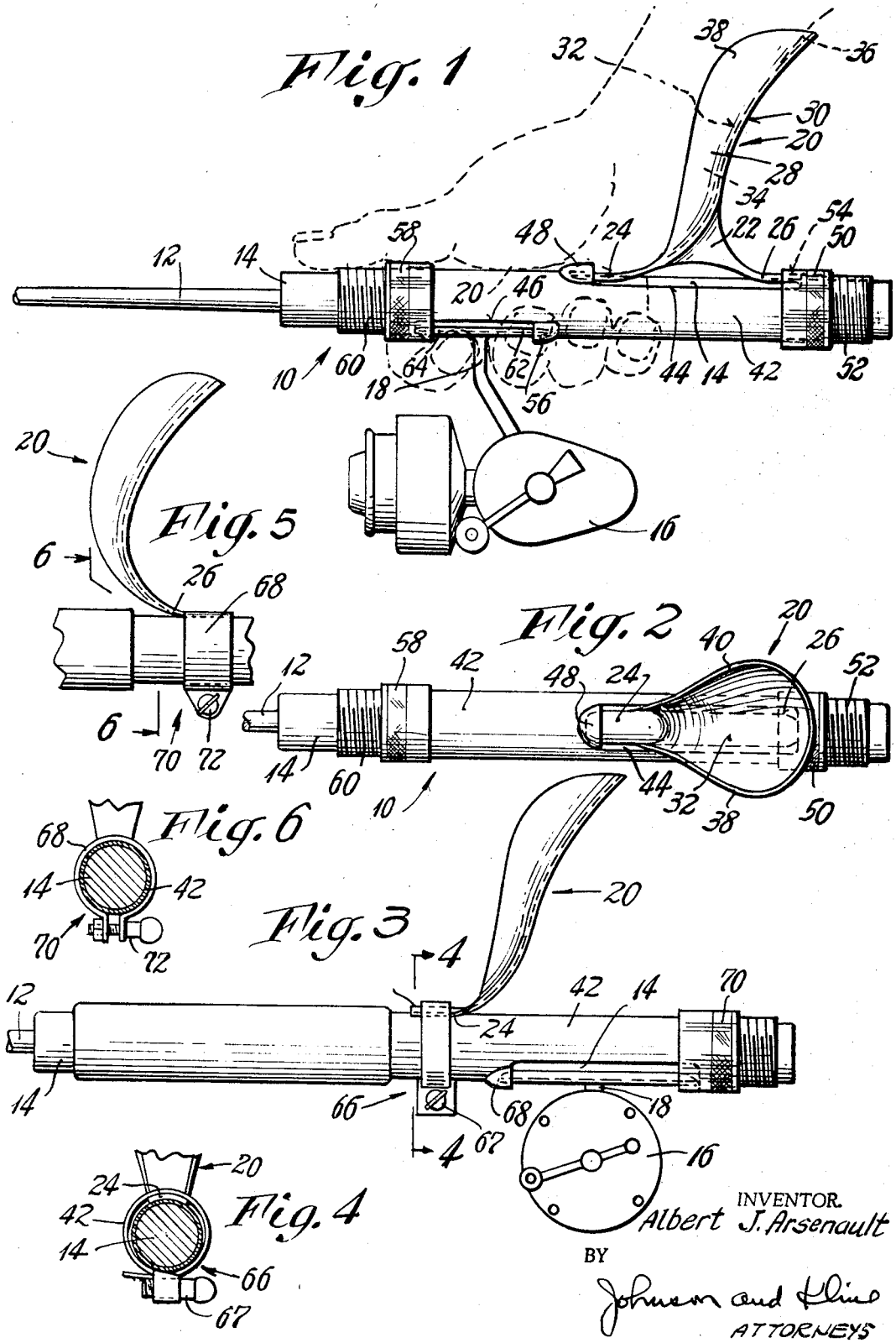
INVENTOR.
Albert J. Arsenault
BY
Johnson and Kline
ATTORNEYS Nov. 12, 1968  A. J. ARSENAULT  3,410,016
FISHING ROD HANDLING DEVICE
Filed Oct. 22, 1965  3 Sheets-Sheet 2
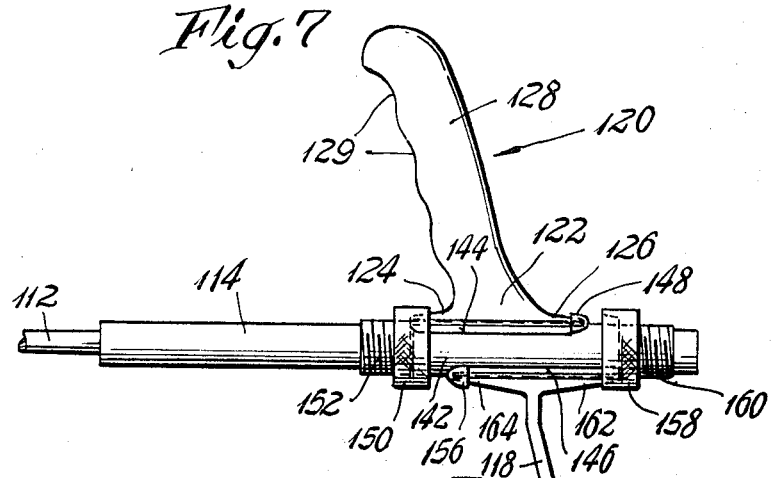
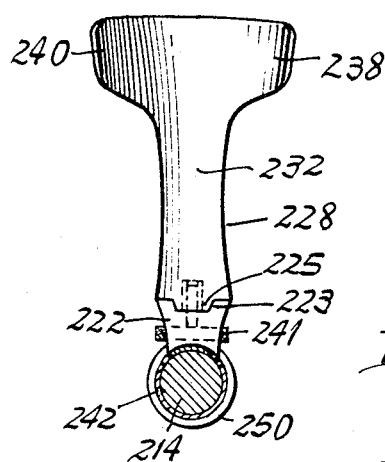
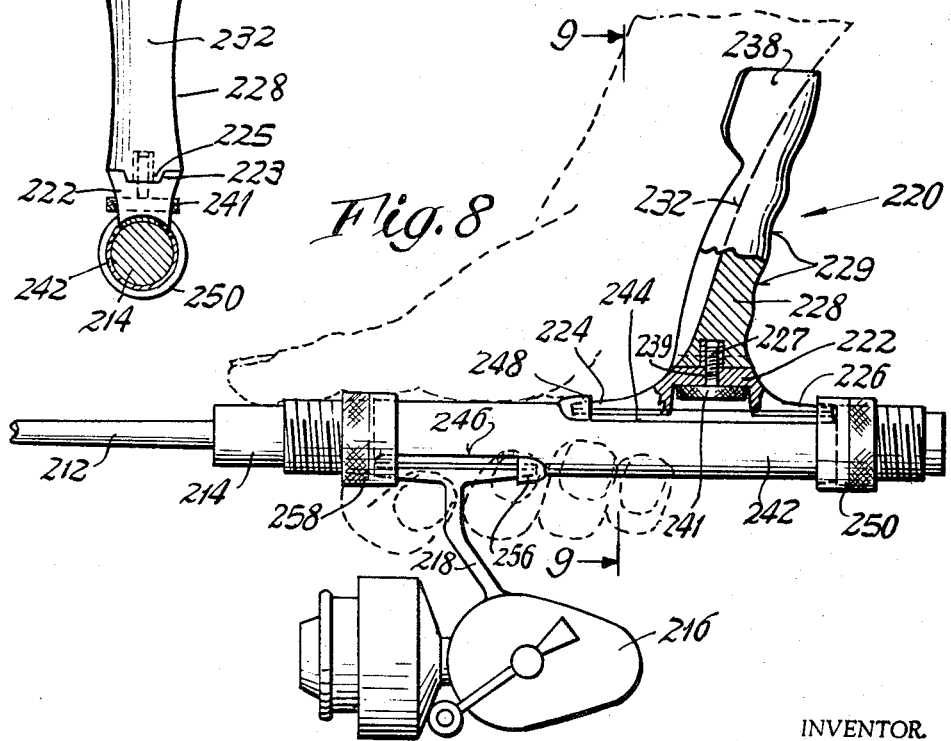
INVENTOR.
Albert J. Arsenault
BY
Johnson and Kline
ATTORNEYS Nov. 12, 1968
A. J. ARSENAULT
3,410,016
FISHING ROD HANDLING DEVICE
Filed Oct. 22, 1965
3 Sheets-Sheet 3
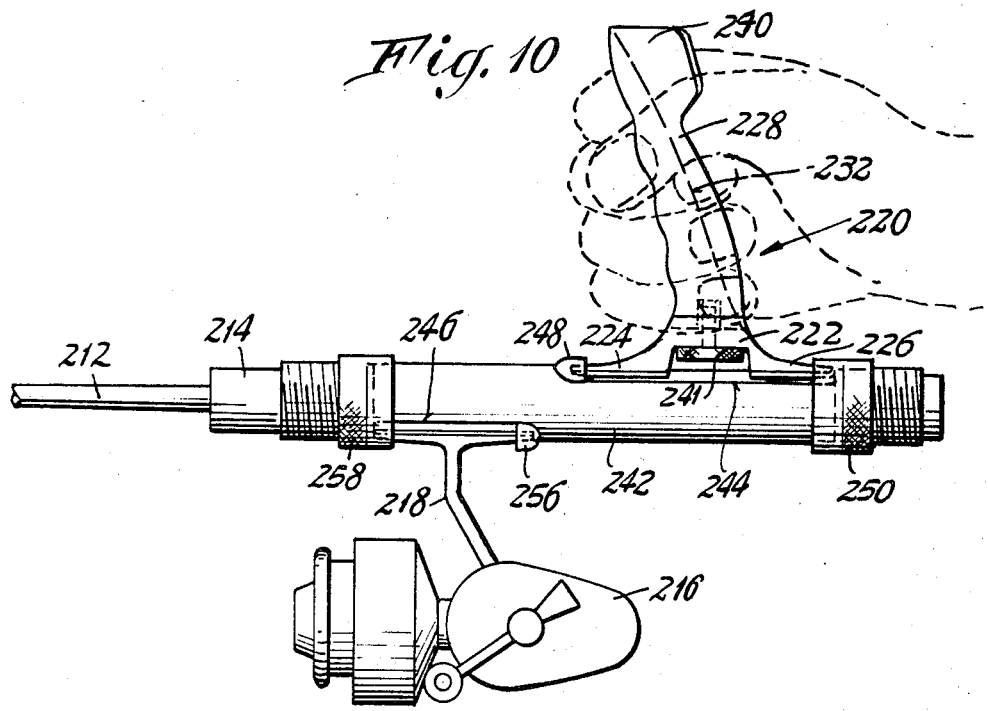
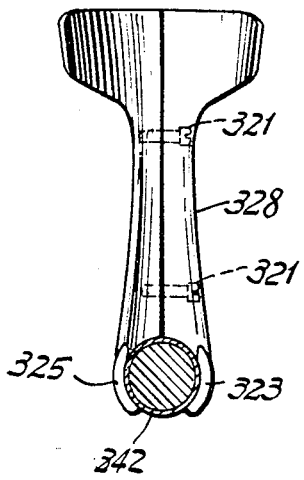
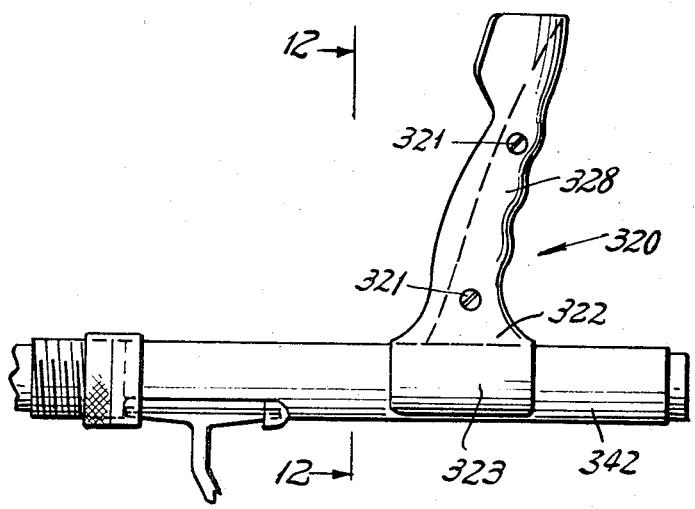
INVENTOR.
Albert J. Arsenault
BY
Johnson and Kline
ATTORNEYS 3,410,016
FISHING ROD HANDLING DEVICE
Albert J. Arsenault, 430 Albert Ave.,
Stratford, Conn. 06497
Filed Oct. 22, 1965, Ser. No. 500,590
15 Claims. (Cl. 43—21.2)

ABSTRACT OF THE DISCLOSURE

A handling device for fishing rods having a mounting base and an upstanding body which is transversely shaped concavely to engage and partially embrace a portion of the user's lower forearm and wrist in the vertical plane of the handle while the fingers of the same hand encircle the handle of the rod, a slotted sleeve on the handle removably receives mounting lugs on the handling device, and threaded collars secure the sleeve to the handle and the handling device to the sleeve. The same sleeve may, in like manner, mount a reel on the handle.

---

The present invention relates generally to improvements in fishing equipment, and more particularly to a fishing rod handling device which aids the user in supporting and manipulating the rod in a variety of different fishing conditions.

A principal object of the present invention is to provide a device having the capability of supporting the user's wrist and lower forearm, or functioning as a hand grip, either individually as separate appliances or selectively in the same appliance.

A further object of the present invention is to provide a device of the character hereinafter described which is removably secured to any suitable fishing rod handle.

The principles of the present invention are embodied in a device constituted as an appliance removably mounted on the handle of any desired fishing rod and comprising an integral member having a base portion for engagement with the rod handle and a body portion having a particular peripheral and cross sectional configuration, and also having a surface of particular facial contour such that the body portion comfortably supports the user's wrist and forearm or provides a comfortably positioned hand grip for palm and finger encirclement in accordance with a predetermined configuration and contour of the body member.

Alternatively the body portion has a cross sectional configuration and has surfaces with specified facial contour such that the body portion selectively presents a wrist and lower forearm supporting surface or functions as a hand grip in accordance with selectable positions in which the body portion is disposed on the base portion in relation to an end of the fishing rod.

According to the invention, provision is made for removably mounting the appliance on the handle of any suitable fishing rod, the means by which the appliance is secured to the rod handle being itself removable, and with the same coacting elements which secure the appliance to the rod handle also serving to secure the removable securing means to the rod handle.

A further feature of the invention is the provision on the removable securing means of means for removably securing the mounting portion of a reel to the rod handle in a manner similar to that in which the appliance is secured so that the same coacting elements also function to secure both the appliance and the reel to the rod handle as well as the removable securing means itself.

A further object of the invention is to provide a handling device which prevents undesirable rotation of the fishing rod while operating the reel under a load such as when reeling in a heavy or active catch.

To this end the body portion is shaped to be laterally enlarged adjacent its upper end so as to partially encircle the lower forearm of the user.

Other objects and advantages of the present invention will be pointed out in the following detailed description thereof which is to be considered in conjunction with the accompanying drawings in which:

FIGURE 1 is a side view of one embodiment of the present invention;
FIG. 2 is a plan view of the embodiment of FIG. 1;
FIG. 3 is a view similar to FIG. 1 of a modification of the device of FIG. 1;
FIG. 4 is a sectional view on the line 4—4 of FIG. 3;
FIG. 5 is a fragmentary side view of another modification of the device of FIG. 1;
FIG. 6 is a sectional view taken on the line 6—6 of FIG. 5;
FIG. 7 is a side view of another embodiment of the invention;
FIG. 8 is a side view of still another embodiment of the invention;
FIG. 9 is a sectional view taken on the line 9—9 of FIG. 8;
FIG. 10 is a view similar to FIG. 8 with a portion of the device in a different position;
FIG. 11 is a side view of another embodiment of the invention; and
FIG. 12 is a sectional view on the line 12—12 of FIG. 11.

One embodiment of the invention is illustrated in FIGS. 1 through 6. Referring to the modification shown in FIG. 1 the device 10 as a whole is shown mounted on a fishing rod having a shaft 12 and a coaxial handle 14. A suitable reel 16 including a mounting portion 18 is disposed on the surface of the handle 14 which is lowermost when the fishing rod is held in normal position for use.

In the modification of FIGURE 1, the attached appliance 20 is a wrist and lower forearm support which comprises an elongate base portion 22 extending generally in the direction of the longitudinal axis of the rod, the base portion having forwardly and rearwardly projecting lugs 24 and 26 which are also disposed in the longitudinal direction of the rod, the lugs 24 and 26 being shaped to lie in engagement with the surface of the handle 14 which is uppermost when the rod is held in a normal position for fishing.

A body portion 28 extends upwardly from the base portion and also laterally therefrom a distance considerably less than the vertical distance so that the body portion is vertically elongate as shown. The body portion 28 is provided with a longitudinal curvature, as indicated by the numeral 30, in a rearward direction relative to the handle 14, this curvature extending over at least a major portion of the length of the body portion 28. As a result of this curvature and the fact that the body portion is formed to be generally thin or sheetlike in cross section, the body portion as a whole is disposed generally in an inclined relationship to the base portion, the angle of inclination of the body portion being relatively slight with the body portion being much closer to the perpendicular to the axis of the base portion than parallel thereto.

When mounted on the handle 14 in this position, the body portion 28 presents a forwardly facing longitudinally convexly curved surface 32 which is engaged by the underside of the user's wrist 34 and the underside of his lower forearm 36 when holding the rod in the manner shown in FIG. 1. The applicane 20 thus serves to maintain the user's wrist and lower forearm in substantial alignment for better support while waiting for a strike and while reeling in the catch by relieving the wrist 32 from the twisting forces which normally tend to break the user's grasp on the rod handle.

As best seen in FIG. 2, the body portion 28 is also provided with a lateral curvature which extends substantially the length of the body portion. The lateral curvature opens toward the forearm end of the handle 14 such that the nonplanar surface 32 is not only longitudinally convex but is also laterally concave so that the surface 32 tends to partially encircle the user's wrist and forearm.

In addition, the body portion 28 has a peripheral configuration in which it is gradually laterally enlarged from its lower end adjacent the base portion 22 toward its upper end to provide a pair of oppositely disposed and laterally curved wings 38 and 40 which further encircle the underside of the user's lower forearm 36.

By this construction, when a user grasps the rod handle in the manner shown, any force acting on the rod tip, whether merely the weight of the rod or a pull on the line, which would tend to rotate the rod about the user's wrist as a fulcrum, is transferred to a corresponding resistive force acting on the user's forearm through the appliance 20. Thus, the fatiguing pressure of holding the rod upwardly inclined while waiting for a strike or reeling in a catch is relieved from the user's wrist, and transferred to a part far more able to withstand the pressure for long periods of time.

In addition, when a strike occurs, the sudden sharp pull on the end of the rod tends to break the user's grip on the handle by causing a twisting motion of the rod as described above. This is obviated by this embodiment of the invention, since the twisting force of the strike is transferred immediately to the user's forearm which cannot bend. Thus the user's forearm, wrist, and hand are maintained in a relatively fixed relation, and the user can therefore keep a firm grip on the handle.

The configuration of the appliance 20 which forms the wings 38 and 40 serves to prevent the fishing rod from rotating on its longitudinal axis as a result of operating the reel 16 to land a fish. Since the wings bear against oppositely disposed portions of the wrist and forearm, they act as opposed levers to prevent the rod from rotating. Also, the pressure on the appliance 20 from a downward force on the shaft 12 tends to keep the user's forearm firmly pressed into the U or V cavity of the body portion 28 so that the wrist and arm of the user cannot slip out.

The appliance 20 is removably secured to the handle 14 by means which itself is removable from the rod handle, the latter means having elements which coact with the appliance base portion to secure both the appliance and the removable securing means to the rod handle 14. Referring to FIG. 1, an elongate sleeve 42 is formed to very closely but slidably fit over the rod handle 14, the sleeve having a pair of elongate apertures 44 and 46 formed in the wall thereof, the apertures being oppositely disposed so that one is adjacent the upper surface of the rod handle and one is adjacent the lower surface of the rod handle when the rod is held in normal position for fishing.

The sleeve 42 is provided with a rearwardly facing socket 48 adjacent the end of the aperture 44 which is inwardly of the ends of the sleeve and a threaded collar 50 engaged with the threaded end 52 of the sleeve 42. The collar 50 has an internally smooth portion 54 which overlies the outer end of the aperture 44 and engages the lug 26 of the base portion 22 when the collar is rotated toward the base portion. The socket 48, lug 24, lug 26 and collar 50 are all shaped so that the lugs 24 and 26 are wedged tightly against the portion of the handle 14 that is exposed through the aperture 44. By this construction, both the appliance 20 and the sleeve 42 are rigidly secured to the handle 14 of the rod.

An additional socket 56 is provided adjacent the inward end of the other aperture 46, and a similar collar 58 is threadedly engaged with the other end 60 of the sleeve 42. The aperture 46 is adapted to receive the mounting portion 18 of the reel 16, the mounting portion 18 also having lugs 62 and 64 which are engaged by the socket 56 and the collar 58 respectively to secure the reel mount 18 to the handle 14 in a manner similar to that described above for the appliance 20. Thus the sleeve 42 also secures the reel 16 to the rod handle 14 and at the same time is itself secured to the rod handle at the end on which the reel is mounted.

In the modification shown in FIGS. 3 and 4, the support member 20 is provided only with the forwardly extending lug 24, and this is secured to the rod handle 14 by a removable clamp 66 which fits over the sleeve 42 and closely resembles a typical hose clamp which is secured by a screw 67. Also, the line reel 16 is secured to the handle in the same manner as shown in FIG. 1, with a socket 68 and a threaded collar 70, but in this instance the reel is mounted rearwardly of the appliance 20. This construction and positioning of the appliance and reel has been found to be more convenient and comfortable in connection with the use of a fly rod where the line itself is manipulated independently of operation of the reel.

FIGS. 5 and 6 illustrate still another modification in which the appliance 20 is provided only with the rearwardly projecting lug 26, but having integral laterally projecting arms 68 which are bent around the sleeve 42 to form a clamp 70 secured by a screw 72. The clamps 66 and 70 permit the appliance of FIGS. 3 and 5 to be secured the fishing rod handle in any desired position and without the necessity of providing special mounting means on the sleeve.

FIG. 7 shows another embodiment of the invention in which an appliance 120 is mounted on the handle portion 114 of a fishing rod. The appliance 120 is a hand grip having a base portion 122 with forwardly and rearwardly projecting lugs 124 and 126 which are similar in shape and function to the lugs 24 and 26 shown in FIG. 1. The body portion 128, which is now inclined forwardly relative to the rod, is generally tubular in cross section and is provided with finger engaging recesses 129 disposed on the forwardmost surface so that the appliance can be comfortably and securely grasped for manipulating the rod.

The hand grip is secured to the rod handle 114 in substantially the same manner as that by which the wrist and arm support shown in FIG. 1 is mounted, except that the hand grip is mounted substantially over the reel 116 rather than rearwardly thereof. The hand grip is secured by a sleeve 142 having a socket 148 and collar 150 threaded on an end 152 of the sleeve, the socket and collar securing the base portion 122 to the portion of the rod handle 114 which is exposed through the aperture 144 provided in the sleeve, all as fully described above.

The lugs 162 and 164 of the reel mount 118 are also secured to the rod handle 114 through the aperture 146 by the socket 156 and collar 158 threaded on the other end 160 of the sleeve 142 in the same manner as described above. The fact that the appliance 120 is a hand grip facilitates the mounting thereof almost directly over the reel, a position, as mentioned above, which is generally found to be more convenient for fly casting.

FIGS. 8–10 show still another embodiment of the invention in which the wrist and arm support appliance 20 and the hand grip appliance 120 are embodied in an appliance 220 having the advantages and features of the separate appliances combined into a single reversible unit. Referring to FIGS. 8 and 9, the appliance 220 comprises a base portion 222 having forwardly and rearwardly projecting lugs 224 and 226 which rest on the portion of the handle 214 that is exposed through the aperture 244 of the sleeve 242. The lugs 224 and 226 respectively are engaged by the socket 248 and the threaded collar 250 to secure the appliance 220 and the sleeve 242 to the handle 214 in the manner described above.

The appliance 220 has a body portion 228 which is provided on one surface with finger engaging recesses 229 substantially like those shown in FIG. 7. An opposite surface 232 is formed to be similar to the surface 32 shown in FIGS. 1 and 2 to act as a wrist and lower forearm support. As seen, the surface 232 is longitudinally convexly curved over a major portion of its length.

The body portion is also provided with laterally extending wings 238 and 240 which are disposed predominantly adjacent the upper end of the body portion so as not to interefere with the user's grasp when the appliance is being used as a hand grip. The wings and the surface 232 are provided with a lateral convex curvature in a manner similar to that described above in connection with FIG. 1 so as to comfortably support the user's wrist and forearm.

Means are provided for reversing the position of the body portion 228 on the base portion 222 without removing the latter from the rod handle 214. The body portion is formed as a separate member from the base portion, the two having contacting surfaces which lie in a plane parallel to the axis of the rod so that the body portion 228 can rotate on an axis perpendicular to the rod. The contacting surfaces are provided with a slot 223 and a mating key 225 formed on the respective surfaces as shown. The body portion 228 is provided with a suitably threaded bore 227 which receives a screw 239 having an enlarged knurled head 241, the screw 239 also passing through a bore in the base portion. It is apparent that by loosening the screw and disengaging the key and slot, the body portion 228 can be rotated 180° from the position shown in FIG. 8 to that shown in FIG. 10, whereupon the device functions as a hand grip rather than a wrist and arm support as is intended in the FIG. 8 position.

The sleeve 242 is also provided with the downwardly facing aperture 246 through which the reel mount 218 is secured to the rod handle 214 by means of the socket 256 and threaded collar 258 in the manner fully described above.

FIGS. 11 and 12 show a modification of the above embodiment in which the body portion 328 and the base portion 322 of a combined appliance 320 are formed integral except that the appliance is longitudinally split as seen in FIG. 12, the half sections being secured together by screws 321. The base portion 322 is provided with oppositely facing curved side extensions 323 and 325 which partially encircle the sleeve 342 and which tightly grip the sleeve to secure the appliance in position when the screws 321 are tightened. The appliance is reversed from one position to another by loosening the screws 321 sufficiently to remove the appliance from the sleeve 342.

It should be understood that the appliances of the present invention are not limited to use on a fishing rod, although primarily intended for such use. They may be used with any device having a shaft and a coaxial handle portion with which wrist and forearm support or better gripping manipulation is desirable. For example, the appliances can be mounted on the handle of a fishing net while scooping a fish from the water, and the user would then have sufficient strength and control with one arm to raise a fish from the water which would otherwise be too heavy to so handle. Additionally, they can be mounted on and used with a variety of available holding devices of various construction which are attached to or made as a part of fishing rods. They can also be used on a fishing pole without a reel.

It should be noted that the devices of this invention do not interfere in any way with conventional manipulation of fishing rods. They do not obstruct freedom of arm movement during casting, and they can be left in place and yet used only when needed, such as in the case of a user who prefers to hold the rod with his forearm to the side of the rod while he is waiting for a strike.

What I claim is:

1. A handling device for a fishing rod having a shaft and a coaxial handle, said device comprising an integrally removable appliance adapted to be mounted on the handle of the rod, said appliance having an elongate base portion extending longitudinally of the rod, the base portion having means for engagement with the surface of the rod handle which is uppermost when the rod is held in its proper spacial relationship for fishing, and a body portion extending generally upwardly from the base portion and laterally therefrom a distance less than that of upward extent so that the body portion is vertically elongate, the body portion being slightly inclined relative to the perpendicular to the axis of the base portion, to dispose the body portion in corresponding inclined relationship to the rod when the appliance is mounted on the rod handle, the body portion further having at least a portion thereof which is transversely concave and engageable with and partially embraces a portion of the user's lower forearm and wrist in the vertical plane of the handle while the fingers of the user's same hand encircle the rod handle for the purpose described when the appliance is mounted on the rod, and means removably securing the base portion of said appliance to said upper surface of the rod handle.

2. The device according to claim 1 wherein the body portion of the appliance is provided with a nonplanar surface which is longitudinally convexly curved from the base portion to the upper end of the body portion and which is laterally concavely curved over the length of the body portion, the body portion having upwardly disposed outwardly projecting wings forming part of the concave surface curvature which are adapted to partially encircle the underside of the user's lower forearm, the body portion constituting a support for the user's wrist and lower forearm when the appliance is mounted on the rod handle adjacent the rearward end thereof and with the aforementioned angular relationship of the body portion and base portion disposing the body portion as inclined downwardly toward the tip of the rod.

3. The device according to claim 2 wherein the body portion is formed of relatively thin sheet material and is gradually laterally enlarged over a major portion of its length to form said wings.

4. A device according to claim 1 wherein the body portion is at least partially rounded in cross section in a manner convenient for grasping encirclement by the palm and fingers of a user's hand, the body portion having finger engaging recesses disposed in vertical alignment along one longitudinally extending surface of the body portion, the body portion constituting a hand grip for manipulating the rod when the body portion is mounted on the rod handle with the aforementioned angular relationship of the body portion and base portion disposing the body portion as inclined downwardly toward the butt of the rod.

5. A device according to claim 4 wherein the body portion is further provided with a nonplanar surface which is longitudinally convexly curved from the base portion to the upper end of the body portion and which is laterally concavely curved over the upper portion of the body portion, the body portion having upwardly disposed outwardly projecting wings forming part of the concave surface curvature which are adapted to partially encircle the underside of the user's forearm, the body portion selectively constituting either a support for the user's wrist and lower forearm when the appliance is mounted on the rod handle adjacent the rearward end thereof and with the aforementioned angular relationship of the body portion and the base portion disposing the body portion as inclined downwardly toward the tip of the rod, or a hand grip for manipulating the rod when the appliance is mounted on the rod handle as aforesaid.

6. A device according to claim 5 wherein the body portion and the base portion are separate elements and there are means for connecting the body portion to the base portion for rotation of the former about an axis perpendicular to the longitudinal axis of the base portion so that the body portion has the proper angular relationship relative to the base portion when set in one of the two diametrically opposed positions for use either as the wrist and lower forearm support or as the hand grip as aforesaid.

7. A device according to claim 6 wherein the body portion and the base portion have nonplanar shaped surfaces capable of mating only in either of said diametrically opposed positions of the body portion, and the connecting means comprises screw threaded means interconnecting the body portion and the base portion for locking the body portion on the base portion in one of said positions, whereby the body portion can be rotated from one position to another while the appliance as a whole is mounted on the rod.

8. A device according to claim 5 wherein the appliance is longitudinally split, being formed of two unitary half sections which are removably connected together, and wherein the means on the base portion for engagement with the rod handle comprises a pair of oppositely facing curved extensions being formed to partially encircle the rod handle.

9. Means for securing a handling appliance and a reel to a fishing rod having a shaft and a coaxial handle, said means comprising an elongated sleeve sized to closely slidably fit over the handle of the rod, the sleeve having a pair of elongate apertures formed in the wall thereof through which the rod handle is exposed, sockets formed in said sleeve adjacent the innermost end of each aperture for receiving a lug formed on said appliance and said reel and for wedging the latter tightly against the rod handle, and collars threadedly engaged with the sleeve adjacent the outermost end of each aperture, the collars having a portion adapted to overlie another lug formed on said appliance and said reel and wedge said other lug tightly against the rod handle when the collars are rotated on the sleeve, whereby the appliance, the reel and the sleeve are all rigidly secured to the rod handle.

10. Means for securing a handling appliance and a reel to a fishing rod as set forth in claim 9 wherein said apertures are disposed in diametrically opposed positions on said sleeve.

11. Means for securing a handling appliance and a reel to a fishing rod as set worth in claim 10 wherein said apertures are disposed in overlapping relationship longitudinally of the sleeve.

12. Means for securing a handling appliance and a reel to a fishing rod as set forth in claim 10 wherein said apertures are disposed substantially in end to end relationship.

13. The invention as defined in claim 9, in which the handling appliance comprises a body portion having a hand grip extending upwardly from the lugs thereon.

14. A handling device for a fishing rod having a shaft and a coaxial handle, said device comprising an integrally removable appliance adapted to be mounted on the handle of the rod, said appliance having an elongate base portion extending longitudinally of the rod the base portion having forwardly and rearwardly extending lugs disposed in the longitudinal direction of the base portion for engagement with the surface of the rod handle which is uppermost when the rod is held in its proper spacial relationship for fishing, and a body portion extending generally upwardly from the base portion and laterally therefrom a distance less than that of upward extent so that the body portion is vertically elongate, the body portion being slightly inclined relative to the perpendicular to the axis of the base portion, to dispose the body portion in corresponding inclined relationship to the rod when the appliance is mounted on the rod handle, the body portion further having at least a portion thereof which is engageable with and partially embraces a portion of the user's lower forearm and wrist in the vertical plane of the handle while the fingers of the user's same hand encircle the rod handle for the purpose described when the appliance is mounted on the rod, and means removably securing the base portion of said appliance to said upper surface of the rod handle comprising an elongate sleeve sized to closely slidably fit over the rod handle, the sleeve having an elongate aperture formed in the wall thereof through which the rod handle is exposed for engagement with said lugs, a socket formed in said sleeve adjacent one end of said aperture for receiving one of said lugs and for wedging the lug tightly against the surface of the rod handle, and a collar threadedly engaged with the sleeve adjacent the other end of the aperture, the collar having a portion which overlies the other lug of the base portion and wedges said other lug tightly against the rod handle when the collar is rotated on the sleeve, whereby both the appliance and the securing means are rigidly secured to the rod handle.

15. A handling device for a fishing rod having a shaft and a coaxial handle, said device comprising an integrally removable appliance adapted to be mounted on the handle of the rod, said appliance having an elongate base portion extending longitudinally of the rod, the base portion having forwardly and rearwardly extending lugs disposed in the longitudinal direction of the base portion for engagement with the surface of the rod handle which is uppermost when the rod is held in its proper spacial relationship for fishing, and a body portion extending generally upwardly from the base portion and laterally therefrom a distance less than that of upward extent so that the body portion is vertically elongate, the body portion being slightly inclined relative to the perpendicular to the axis of the base portion, to dispose the body portion in corresponding inclined relationship to the rod when the appliance is mounted on the rod handle, the body portion further having at least a portion thereof which is engageable with and partially embraces a portion of the user's lower forearm and wrist in the vertical plane of the handle while the fingers of the user's same hand encircle the rod handle for the purpose described when the appliance is mounted on the rod, and means removably securing the base portion of said appliance to said upper surface of the rod handle comprising an elongate sleeve sized to closely slidably fit over the rod handle, the sleeve having a pair of elongate apertures formed in the wall thereof through which the rod handle is exposed for engagement with said lugs and for engagement with a mounting portion of a reel, sockets formed in said sleeve adjacent the innermost end of each aperture for receiving one of said lugs and a corresponding lug on the reel mounting portion and for wedging the lugs tightly against the surface of the rod handle, and collars threadedly engaged with the sleeve adjacent the outermost end of each aperture, the collars having a portion which overlies the other lug of the base portion and the reel mounting portion and wedges them tightly against the rod handle when the collars are rotated on the sleeve, whereby the appliance, the reel mounting portion and the securing means are all rigidly secured to the rod handle.

References Cited

UNITED STATES PATENTS

| 402,594 | 5/1899 | Hook | 43—22 |
|---|---|---|---|
| 930,181 | 8/1909 | Huffman | 43—22 |
| 2,180,323 | 11/1939 | Maxwell | 43—23 |
| 2,194,029 | 3/1940 | Morehouse | 43—22 |
| 2,482,192 | 9/1949 | MacDonald | 43—25 |
| 2,592,878 | 4/1952 | Esposito | 43—22 |
| 3,029,543 | 4/1962 | Budd | 43—25 |
| 2,542,253 | 2/1951 | King | 43—21.2 |
| 3,310,904 | 3/1967 | Binvignat | 43—22 |
| 3,367,056 | 2/1968 | Johnson | 43—25 |

FOREIGN PATENTS 20,882    1896    Great Britain.

ALDRICH F. MEDBERY, *Primary Examiner.*

J. H. CZERWONKY, *Assistant Examiner.*